United States Patent [19]

Taylor

[11] Patent Number: 4,922,698
[45] Date of Patent: May 8, 1990

[54] CUTTER BAR WITH INDEXABLE BLADES FOR ROTARY LAWN MOWERS

[76] Inventor: Lyle M. Taylor, 523 Lind St., Quincy, Ill. 62301

[21] Appl. No.: 404,169

[22] Filed: Sep. 7, 1989

[51] Int. Cl.$^5$ .................... A01D 34/73; A01D 34/52
[52] U.S. Cl. ........................................ 56/295; 56/17.5
[58] Field of Search .................... 56/17.5, 255, 295; 30/41.7, 347

[56] References Cited

U.S. PATENT DOCUMENTS

| | | | |
|---|---|---|---|
| 1,992,107 | 2/1935 | Wheeler | 30/41.7 X |
| 2,527,472 | 10/1950 | Wolf | 56/295 X |
| 2,576,884 | 11/1951 | Leigh | 56/295 |
| 2,651,159 | 9/1953 | Roundtree, Sr. | 56/295 X |
| 2,722,797 | 11/1955 | Strattman | 56/295 |
| 2,769,784 | 11/1973 | Jones | 56/295 |
| 2,786,322 | 3/1957 | McEvers | 56/295 |
| 3,090,187 | 5/1963 | Livingston | 56/295 |
| 3,103,093 | 9/1963 | House, Jr. | 56/295 |
| 3,327,460 | 6/1967 | Blackstone | 56/295 |
| 3,563,015 | 2/1971 | Renfroe | 56/295 |
| 3,949,541 | 4/1976 | Henry | 56/295 |
| 4,043,104 | 8/1977 | Jones | 56/295 |
| 4,261,162 | 4/1981 | Juncker | 56/295 |
| 4,611,460 | 9/1986 | Parker | 56/295 |
| 4,712,364 | 12/1987 | Oxley | 56/17.5 X |
| 4,750,320 | 6/1988 | Liebl | 56/295 |

Primary Examiner—George A. Suchfield
Attorney, Agent, or Firm—Grace J. Fishel

[57] ABSTRACT

A cutter bar with indexable blades for a rotary lawn mower which can be substituted for a conventional cutter bar in the rotary lawn mower and is replaceable and easily indexable without detaching the replaceable blade from the cutter bar or upending the mower. The cutter bar has a recess with abutment shoulders on opposite ends thereof for receiving the indexable blades, each such indexable blade comprising a plate with a plurality of sides sharpened into cutting edges and a socket with a hole for receiving the head of a bolt. Each recess in the cutter bar has a socket into which the socket of the indexable blade is fitted and a hole for receiving the shank of the bolt. The indexable blades are held in the recesses with a nut threaded on the bolt which is preferably a carriage bolt with means for retaining the nut on the shank when the nut is loosened.

10 Claims, 1 Drawing Sheet

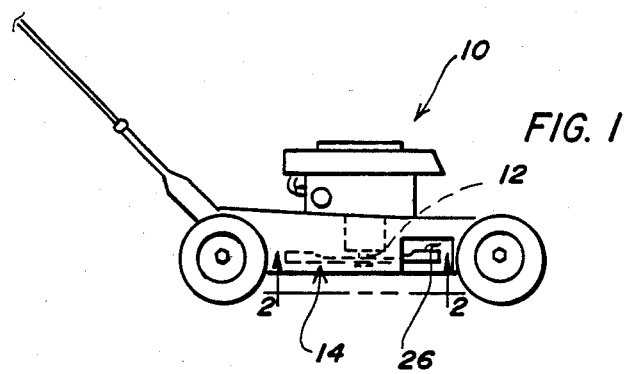
FIG. 1
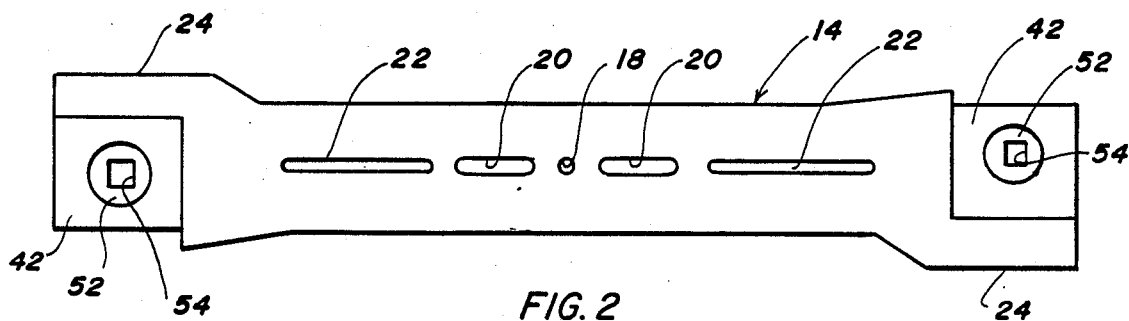
FIG. 2
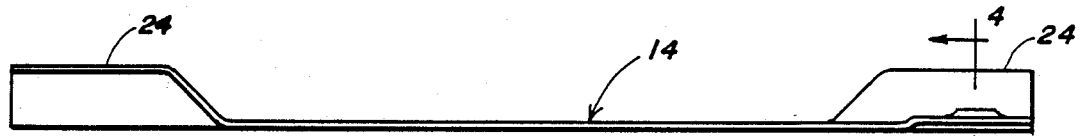
FIG. 3
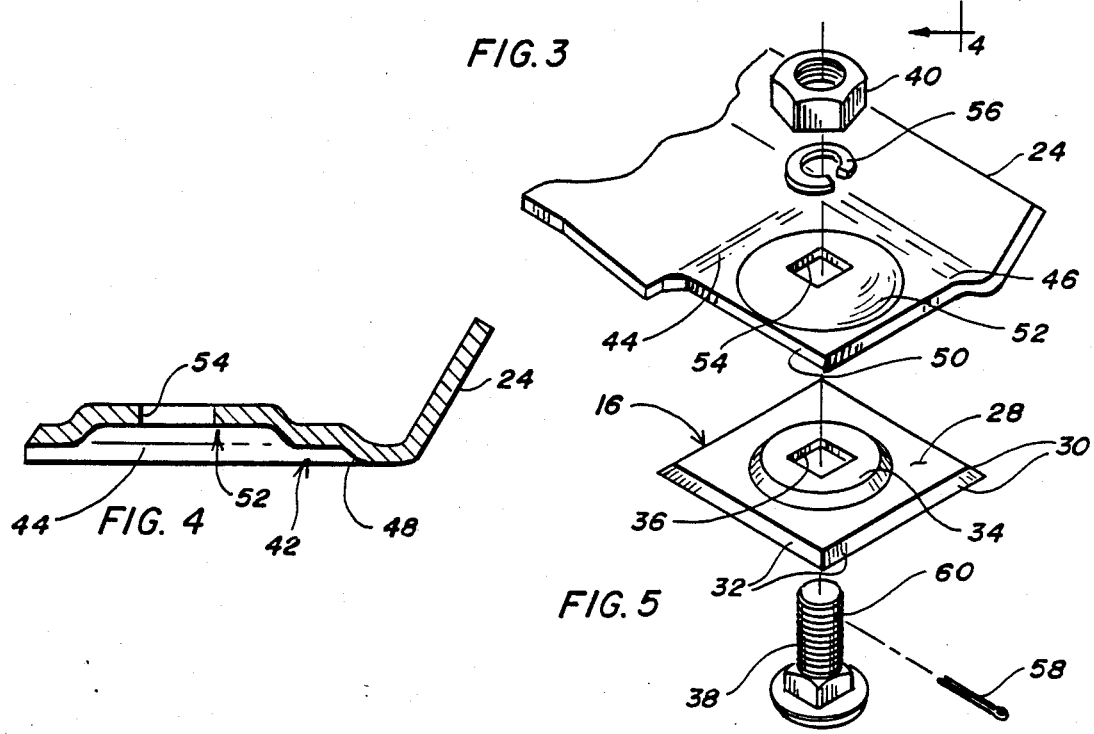
FIG. 4
FIG. 5

CUTTER BAR WITH INDEXABLE BLADES FOR ROTARY LAWN MOWERS

BACKGROUND OF THE INVENTION

The present invention relates to a cutter bar with indexable blades for rotary lawn mowers, said blades being replaceable and having a plurality of cutting edges which can be easily indexed into cutting position without detaching the replaceable blade from the cutter bar or upending the mower.

A conventional cutter bar on a rotary lawn mower becomes dulled over a period of time and must be removed for resharpening or for replacement. Such wear varies greatly upon the extent of use and damage by foreign objects such as rocks and the like. The cutter bar is attached to the power shaft with a nut. The power shaft is held by the compression of the engine and tends to rotate with the nut during removal of the cutter bar unless the shaft is held with a pair of vice grips or the like. If the mower is gasoline powered, it is advantageous to drain the gas tank first since the mower is stood on its side while the cutter bar is being removed.

Various types of rotary cutter bars with replaceable blades have been proposed to avoid removing the cutter bar for resharpening or replacement. In the main, however, the replaceable blades have proved difficult to remove requiring upending the mower in the same manner that is required for removing the cutter bar. In addition, they have also presented problems of one kind or another with regard to complex fabrications, strength, cost or the like. Included in the prior art have been cutter bars with blades having a plurality of cutting edges, a sharp one of which can be indexed into cutting position but, unlike the present invention, only after upending the mower and detaching the blade from the cutter bar.

In view of the above, there has remained a need for a cutter bar with indexable blades for rotary lawn mowers wherein the indexable blades are replaceable and easily indexed into cutting position. It is therefore an object of the present invention to provide such a cutter bar. Other objects and features of the invention will be in part apparent and in part pointed out hereinafter.

SUMMARY OF THE INVENTION

The objects of invention are satisfied by a cutter bar with indexable blades for a rotary lawn mower wherein the cutter bar has a recess on opposite ends thereof for receiving the indexable blades. Each indexable blade is formed as a plate with a plurality of sides sharpened into cutting edges and a socket with a hole for receiving the head of a bolt. Each recess in the cutter bar also has a socket into which the socket of the indexable blade is fitted and a hole for receiving the shank of the bolt. The indexable blade is held in the recess in the cutter bar with a nut which is threaded on the bolt. The indexable blade can be indexed on the bolt such that a new cutting edge is presented along the leading edge of the cutter bar by loosening the nut enough such that the indexable blade drops out of the recess and can be rotated one flat. When all of the cutting edges have been dulled, the nut can be removed and the indexable blade replaced.

In a preferred form, the plate is quadrilateral in shape and the bolt is a carriage bolt, the neck of which is received in the hole in the socket of the indexable blade and in the hole in the socket of the cutter bar. Means are also provided for retaining the nut on the shank when it is loosened and for locking the nut on the bolt.

The invention accordingly comprises the constructions hereinafter further described and their equivalents, the scope of the invention being indicated in the subjoined claims.

BRIEF DESCRIPTION OF THE DRAWINGS

FIG. 1 is a side elevational view of a lawn mower equipped with a rotary cutter bar with indexable blades in accordance with the present invention;

FIG. 2 is a top plan view of the cutter bar;

FIG. 3 is a side elevational view of the cutter bar;

FIG. 4 is a sectional view taken along line 4—4 in FIG. 3; and,

FIG. 5 is an exploded view showing the manner in which the indexable blades are attached to the cutter bar.

DETAILED DESCRIPTION OF THE INVENTION

Referring to the drawings more particularly by reference character, reference numeral 10 refers to a rotary lawn mower having a power shaft 12 providing a support for cutter bar 14 with indexable blades 16 in accordance with the present invention. Cutter bar 14 operates in a horizontal plane and has a hole 18 and slots 20 or the like for attachment to power shaft 12 in the usual manner.

As illustrated in FIGS. 2-4, cutter bar 14 includes longitudinal reinforcing ribs 22 and an upwardly bent portion 24 at opposite ends thereof forming an air flange. Air flanges 24 project rearwardly of the trailing edge of cutter bar 14 and provide a lifting action on the grass facilitating cutting and movement of the cut grass towards a mower discharge outlet 26. As shown, they are preferably formed as an extension on the trailing edge of cutter bar 14 for use as described below.

Indexable blades 16 are formed as a plate 28 having a plurality of sides 30 which are beveled to provide a plurality of cutting edges 32. The particular blade shown in FIG. 5 is square but blades with more or less sides can be fabricated. Indexable blades 16 include a socket 34 formed in the top face of plate 28 with a hole 36 formed therein for receipt of a bolt 38 by means of which it is secured with a nut 40 to cutter bar 14. To prevent indexable blades 16 from rotating, it is preferred that hole 36 be square and that bolt 38 be a carriage bolt, the neck of which fits in hole 36. The depth of socket 34 is selected such that the head of bolt 38 is generally flush with the bottom face of plate 28 to minimize interference with the cutting action.

Indexable blades 16 are received in cutter bar 14 at opposite ends thereof in upwardly offset recesses 42 such that the bottom face of plate 28 is generally flush with the bottom face of the balance of cutter bar 14. Recesses 42 have a size and shape to provide a bearing surface for a portion of indexable blades 16, a typical one of which is illustrated in FIG. 5.

As shown in FIG. 5, recesses 42 are quadrilateral because indexable blade 16 has four sides. Each recess 42 has a shoulder 44 along one side and another 46 at the back serving as a stop for indexable blades 16. Shoulder 46 is reinforced by air flange 24 which is positioned just behind recess 42 along the trailing edge of cutter bar 14. Shoulders 44 and 46 are beveled at generally the same slope 48 as cutting edges 32 providing a close fit between mating surfaces to prevent cut grass from catching and impairing the cutting action. Recesses 42 are open at the other side opposite shoulder 44 and notched back at 50 and open opposite shoulder 46.

With continuing reference to FIG. 5, recesses 42 include a socket 52 for receipt of socket 34 associated with plate 28. Socket 52 further includes a hole 54 in registry with hole 36 for receipt of bolt 38 by means of which, as aforementioned, indexable blades 16 are attached with nut 40 to cutter bar 14. For safety reasons, a locking means shown as locking washer 56 is provided under nut 40 and a means for retaining the nut shown as a cotter pin 58 which is inserted through a hole 60 in the shank of bolt 38 after nut 40 has been attached. A small tolerance is preferably left between sockets 52 and 34, the latter one of which serves as an auxiliary locking means working against nut 40 when blades 16 are tightened up on cutter bar 14. As best seen in FIG. 2, the leading edge of cutter bar 14 is preferably curved adjacent recess 42 such that the inboard leading edge of indexable blades 16 is flush with the leading edge of cutter bar 14.

In use, cutter bar 14 with a set of indexable blades 16 already attached is substituted for a conventional cutter bar in rotary lawn mower 10. When cutting edge 32 of indexable blades 16 is dulled, blades 16 are indexed one flat. This is easily accomplished by reaching through discharge outlet 26 with a wrench and loosening nut 40. When bolt 38 is a carriage bolt with its neck in holes 36 and 54, the head of bolt 38 is stopped from rotation with nut 40. When cotter pin 58 is present, nut 40 is loosened until plate 28 drops out of recess 42 and hangs on the head of bolt 38 such that indexable blade 16 can be rotated past shoulders 44 and 46. Once this is done, nut 40 is simply retightened and the indexable blade on the opposite end of cutter bar 14 similarly advanced one flat. When all of cutting edges 32 are dulled, cotter pin 58 is pulled out of hole 60, nut 40 removed and indexable blades 16 replaced with new blades.

During operation of the mower, shoulders 44 and 46 and, when 38 is a carriage bolt, holes 36 and 54 prevent rotation of indexable blades 16. It will also be seen that the shear on bolt 38 is partially shared by sockets 34 and 52 and by shoulder 46.

In view of the above, it will be seen that the several objects of the invention are achieved and other advantageous results attained. As various changes could be made in the above invention, it is intended that all matter contained in the above description or shown in the accompanying drawings shall be interpreted as illustrative and not in a limiting sense.

What is claimed:

1. A cutter bar with indexable blades for a rotary lawn mower, said cutter bar having a recess on opposite ends thereof for receiving the indexable blades, each said indexable blade comprising a plate with a plurality of sides sharpened into cutting edges and a socket with a hole for receiving the head of a bolt, each said recess in the cutter bar having a socket into which the socket of the indexable blade is fitted and a hole for receiving the shank of the bolt, said indexable blade held in the recess in the cutter bar with a nut threaded on the bolt.

2. The cutter bar with indexable blades of claim 1 wherein the recess is upwardly offset in the cutter bar for receiving the indexable blades with the bottom face thereof generally flush with the bottom face of the cutter bar.

3. The cutter bar with indexable blades of claim 2 wherein said recesses are open along the leading edge and end of the cutter bar and closed along the trailing edge and side opposite the end of the cutter bar with abutment shoulders along the closed edges and further having an air flange formed as an extension on the cutter bar and positioned along the trailing edge thereof behind the recess.

4. The cutter bar with indexable blades of claim 3 wherein the bolt is a carriage bolt with a cotter pin in the shank for retaining the nut thereon.

5. The cutter bar with indexable blades of claim 3 wherein a locking washer is provided on the shank of the bolt under the nut and wherein a tolerance is provided between the sockets in the cutter bar and the sockets in the indexable blades into which they are received causing the sockets in the indexable blades to work as an auxiliary locking washer against the nut when the indexable blades are tightened into the recesses by the nuts.

6. A cutter bar with indexable blades for a rotary lawn mower, said cutter bar having a quadrilateral recess on opposite ends thereof for receiving the indexable blades, each said indexable blade comprising a plate with four sides beveled into cutting edges and a socket with a hole for receiving the head and neck of a carriage bolt, each said recess in the cutter bar having a socket into which the socket of the indexable blade is fitted and a hole for receiving the neck of the carriage bolt, said indexable blade held in the cutter bar with a nut threaded on the carriage bolt, said recess being upwardly offset in the cutter bar for receiving the indexable blades with the bottom face thereof generally flush with the bottom face of the cutter bar and open along the leading edge and end of the cutter bar and closed along the trailing edge and side opposite the end of the cutter bar with abutment shoulders having the same general slope as the beveled cutting edges to provide a close fit between mating surfaces thereof.

7. The cutter bar with indexable blades of claim 6 further having an air flange formed as an extension on the cutter bar and positioned along the trailing edge thereof behind the recess.

8. The cutter bar with indexable blades of claim 7 wherein the carriage bolt has means for retaining the nut on the shank when it is loosened.

9. The cutter bar with indexable blades of claim 7 wherein a locking means are provided on the shank of the bolt under the nut and wherein auxiliary locking means are provided under the head of the bolt.

10. The cutter bar with indexable blades of claim 9 wherein the locking means under the nut is a locking washer and the auxiliary locking means under the head of the bolt is formed by providing a tolerance between the sockets in the cutter bar and the sockets in the indexable blades into which they are received causing the socket in the indexable blade to work against the nut when the indexable blades are tightened into the recesses by the nuts.

* * * * *